(12) United States Patent
Yoshimoto

(10) Patent No.: US 8,942,093 B2  
(45) Date of Patent: Jan. 27, 2015

(54) TRANSMISSION APPARATUS WITH PACKET SHAPING CAPABILITIES, AND INTERFACE CARD THEREFOR

(75) Inventor: Masahiro Yoshimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 283 days.

(21) Appl. No.: 13/403,202

(22) Filed: Feb. 23, 2012

(65) Prior Publication Data

US 2012/0263192 A1 Oct. 18, 2012

(30) Foreign Application Priority Data

Apr. 18, 2011 (JP) ................. 2011-091678

(51) Int. Cl.
- *H04J 3/22* (2006.01)
- *H04L 12/931* (2013.01)
- *H04L 12/935* (2013.01)
- *H04L 12/70* (2013.01)

(52) U.S. Cl.
CPC .............. *H04L 49/205* (2013.01); *H04L 49/30* (2013.01); *H04L 2012/568* (2013.01)
USPC ....................... 370/230.1; 370/235

(58) Field of Classification Search
CPC ..... H01L 47/10; H01L 47/22; H01L 47/2441; H01L 47/225
USPC .................... 370/230.1, 235, 235.1
See application file for complete search history.

(56) References Cited

U.S. PATENT DOCUMENTS

| | | | |
|---|---|---|---|
| 6,687,225 B1 | 2/2004 | Kawarai et al. | |
| 7,697,517 B2 | 4/2010 | Yazaki et al. | |
| 2003/0081635 A1 | 5/2003 | Ando et al. | |
| 2003/0107988 A1* | 6/2003 | Lodha et al. | 370/229 |
| 2004/0196788 A1* | 10/2004 | Lodha | 370/230 |
| 2006/0140167 A1* | 6/2006 | Nishimura | 370/351 |
| 2008/0101406 A1* | 5/2008 | Matoba | 370/468 |
| 2009/0116489 A1* | 5/2009 | Hanks | 370/394 |
| 2010/0189063 A1* | 7/2010 | Kokku et al. | 370/329 |
| 2011/0019571 A1* | 1/2011 | Chen et al. | 370/252 |
| 2012/0176896 A1* | 7/2012 | Denman | 370/230.1 |

FOREIGN PATENT DOCUMENTS

| | | |
|---|---|---|
| JP | 05-252188 | 9/1993 |
| JP | 10-303917 | 11/1998 |
| JP | 2000-151630 | 5/2000 |
| JP | 2003-143217 | 5/2003 |
| JP | 2007-201965 | 8/2007 |
| JP | 2009-171372 | 7/2009 |

OTHER PUBLICATIONS

JPOA—Office Action for Japanese Patent Application No. 2011-091678 issued on Sep. 16, 2014, with English translation of relevant part: p. 1 line 17 to p. 2 line 11.

\* cited by examiner

*Primary Examiner* — Habte Mered

(74) *Attorney, Agent, or Firm* — Fujitsu Patent Center

(57) ABSTRACT

In a transmission apparatus, a shaping circuit shapes a packet output from a switch in a band of predetermined granularity. A packet generation circuit generates a band correction packet in a band smaller than the band of the predetermined granularity of the shaping circuit and inputs the band correction packet to the shaping circuit.

7 Claims, 14 Drawing Sheets

FIG. 11

| SHAPER SETTING RATE [kbps] | BAND CORRECTION PACKET RATE [kbps] | USER PACKET RATE [kbps] |
|---|---|---|
| 500 | 450 | 50 |
|  | 400 | 100 |
|  | 350 | 150 |
|  | 300 | 200 |
|  | 250 | 250 |
|  | 200 | 300 |
|  | 150 | 350 |
|  | 100 | 400 |
|  | 50 | 450 |
|  | 0 | 500 |
| 1000 | 450 | 550 |
|  | 400 | 600 |
|  | 350 | 650 |
|  | 300 | 700 |
|  | 250 | 750 |
|  | 200 | 800 |
|  | 150 | 850 |
|  | 100 | 900 |
|  | 50 | 950 |
|  | 0 | 1000 |

FIG. 14

| E1-Xv | A<br>Line Band<br>[bps] | B<br>Payload<br>Band<br>[kbps] | C<br>Shaper<br>Setting<br>Rate<br>[kbps] | D<br>Band<br>Correction<br>Packet<br>Send<br>Period<br>[ms] | E<br>Band<br>Correction<br>Packet<br>Length<br>[byte] | F<br>Band<br>Correction<br>Packet<br>Rate<br>[packets/s] | G<br>Band<br>Correction<br>Packet<br>Rate<br>[kbps] |
|---|---|---|---|---|---|---|---|
| E1-1v | 2048 | 1980 | 2000 | 25.6 | 64 | 39.1 | 20.0 |
| E1-2v | 4096 | 3960 | 4000 | 12.8 | 64 | 78.1 | 40.0 |
| E1-3v | 6144 | 5940 | 6000 | 8.5 | 64 | 117.2 | 60.0 |
| E1-4v | 8192 | 7920 | 8000 | 6.4 | 64 | 156.3 | 80.0 |
| E1-5v | 10240 | 9900 | 10000 | 5.1 | 64 | 195.3 | 100.0 |
| E1-6v | 12288 | 11880 | 12000 | 4.3 | 64 | 234.4 | 120.0 |
| E1-7v | 14336 | 13860 | 14000 | 3.7 | 64 | 273.4 | 140.0 |
| E1-8v | 16384 | 15840 | 16000 | 3.2 | 64 | 312.5 | 160.0 |
| E1-9v | 18432 | 17820 | 18000 | 2.8 | 64 | 351.6 | 180.0 |
| E1-10v | 20480 | 19800 | 20000 | 2.6 | 64 | 390.6 | 200.0 |
| E1-11v | 22528 | 21780 | 22000 | 2.3 | 64 | 429.7 | 220.0 |
| E1-12v | 24576 | 23760 | 24000 | 2.1 | 64 | 468.8 | 240.0 |
| E1-13v | 26624 | 25740 | 26000 | 2.0 | 64 | 507.8 | 260.0 |
| E1-14v | 28672 | 27720 | 28000 | 1.8 | 64 | 546.9 | 280.0 |
| E1-15v | 30720 | 29700 | 30000 | 1.7 | 64 | 585.9 | 300.0 |
| E1-16v | 32768 | 31680 | 32000 | 1.6 | 64 | 625.0 | 320.0 |

US 8,942,093 B2

TRANSMISSION APPARATUS WITH PACKET SHAPING CAPABILITIES, AND INTERFACE CARD THEREFOR

CROSS-REFERENCE TO RELATED APPLICATION

This application is based upon and claims the benefit of priority of the prior Japanese Patent Application No. 2011-091678, filed on Apr. 18, 2011, the entire contents of which are incorporated herein by reference.

FIELD

The embodiments discussed herein relate to a transmission apparatus that transmits a packet and an interface card thereof.

BACKGROUND

In general, among methods for controlling traffic in a computer network, a control method for leveling traffic so as not to exceed the regulated maximum speed by adjusting the intervals of sending packets is referred to as traffic shaping. As traffic shaping control, a method for controlling the maximum transfer rate (rate is limited) is widely applied.

The traffic shaping is implemented mainly by hardware. In the traffic shaping, the traffic flow rate is measured by, in general, the token bucket algorithm, and each packet is buffered into each FIFO (First In First Out) buffer formed into a hierarchy and is output after being subjected to leveling and flow rate limitation so as to meet each traffic service level agreement (SLA).

In the above-mentioned hardware, there exists granularity which is feasible precision, for the setting of data rate desired to be limited, because of the token size of the token bucket algorithm and the transfer time difference of a packet having a variable length. At present, the physical interface of 10 Gbps has spread and 1 Mbps, 500 kbps, etc., are used generally as granularity thereof.

It should be noted that conventionally, there is proposed a packet communication system capable of realizing a system excellent in fairness of throughput between flows without causing deterioration of switch characteristics (for example, see Japanese Laid-Open Patent Publication No. 2003-143217).

Furthermore, there is proposed a packet relay capable of controlling the overall band of packets to be transmitted to a plurality of output lines (for example, see Japanese Laid-Open Patent Publication No. 2007-201965).

However, there has been a problem in which the shaper setting rate of traffic shaping does not agree with the band of the physical line of the output destination because of the presence of granularity at which a packet is shaped.

For example, the granularity of a shaping circuit for shaping a packet is set to 500 kbps, the shaper setting rate of the shaping circuit (band of the packet output from the shaping circuit) is set to 2.0 Mbps, and the band of the physical line of the output destination of the shaping circuit is set to 1.980 Mbps.

In this case, the output band of the shaping circuit becomes 20 kbps (2.0 Mbps-1.980 Mbps) surplus to the band of the physical line. Because of that, the surplus packets are disposed of before being output to the physical line.

Furthermore, in the above-mentioned conditions, it is assumed that the shaper setting rate of the shaping circuit is set to 1.5 Mbps.

In this case, the output band of the shaping circuit becomes short of 480 kbps (1.5 Mbps-1.980 Mbps) as compared with the band of the physical line. Because of that, the physical line does not use the full band corresponding thereto.

SUMMARY

According to an aspect, a transmission apparatus which transmits a packet includes a shaping circuit configured to shape the packet in a band of predetermined granularity and a packet generation circuit configured to generate a band correction packet which is input to the shaping circuit and which has a band smaller than the band of the predetermined granularity.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 11 explains an example of a shaping rate;

FIG. 14 illustrates a setting example of a physical line and an amount of sending band correction packets.

DESCRIPTION OF EMBODIMENTS

Figure 1:
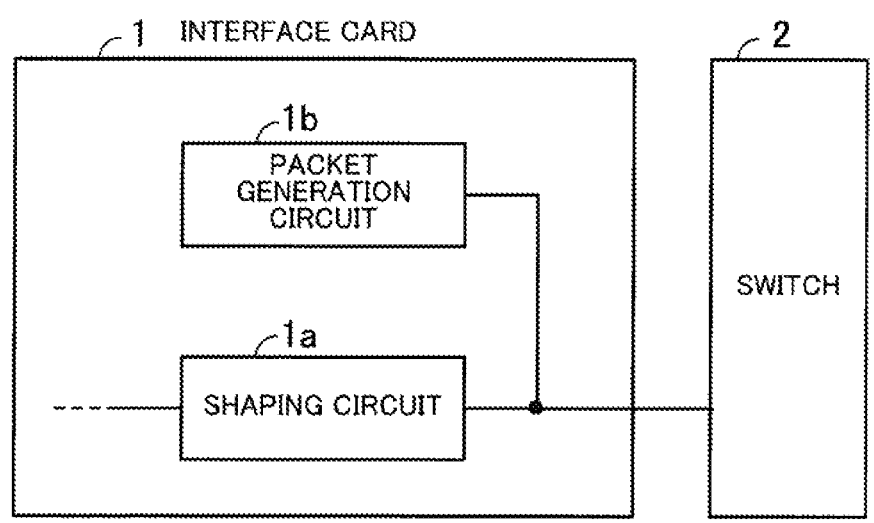
FIG. 1 illustrates an example of a transmission apparatus according to a first embodiment.

Several embodiments will be described below in detail with reference to the accompanying drawings, wherein like reference numerals refer to like elements throughout.

(First Embodiment)

FIG. 1 illustrates an example of a transmission apparatus according to a first embodiment. As illustrated in FIG. 1, the transmission apparatus has an interface card 1 and a switch 2. Only one interface card 1 is illustrated in FIG. 1, but two or more may exist.

The interface card 1 receives a packet at a region not illustrated schematically, from a physical line and outputs the packet to the switch 2. The switch 2 switches the path of the packet to another and outputs the packet to the interface card corresponding to the other path to which the original path is switched. The interface card 1 outputs the packet the path of which is switched to another by the switch 2, to the physical line.

The interface card 1 has a shaping circuit 1a and a packet generation circuit 1b. The shaping circuit 1a shapes a packet in a band of predetermined granularity. For example, the shaping circuit 1a shapes a packet output from the switch 2 in a band of predetermined granularity and outputs the packet. The shaped packet is output to the physical line.

The packet generation circuit 1b generates a band correction packet in a band smaller than the band of predetermined granularity of the shaping circuit 1a. For example, if the band of predetermined granularity at which a packet of the shaping circuit 1a is shaped is set to 500 kbps, the packet generation circuit 1b generates a band correction packet in a band of 20 kbps, which is smaller than the band of 500 kbps. The band correction packet generated by the packet generation circuit 1b is input to the shaping circuit 1a. Each part of the interface card 1 is formed by, for example, a semiconductor chip including an integrated circuit.

The operation of the transmission apparatus of FIG. 1 will be explained. In the following, explanation will be given on the assumption that the band of predetermined granularity at which a packet of the shaping circuit 1a is shaped is 500 kbps, the shaper setting rate is 2.0 Mbps, and the physical line band to which the packet is output is 1,980 kbps. Furthermore, it is assumed that the traffic class of the band correction packet has the highest priority.

The packet generation circuit 1b generates a band correction packet in a band smaller than the band of '500 kbps' of predetermined granularity of the shaping circuit 1a. For example, the packet generation circuit 1b generates a band correction packet of 20 kbps.

To the shaping circuit 1a, the band correction packet of 20 kbps generated in the packet generation circuit 1b and a packet to be output from the switch 2 are input. The band correction packet is a packet having the highest priority, and thus, the band correction packet is output in the full band of 20 kbps from the shaping circuit 1a. Consequently, 20 kbps of 2.0 Mbps of the shaping setting rate of the shaping circuit 1a is consumed by the band correction packet. As a result, the band of the packet to be output from the switch 2 is 1.980 Mbps, which is the same as that of the physical line band, when the packet is output from the shaping circuit 1a.

That is, it becomes possible for the shaping circuit 1a to set a shaping rate finer than the band of predetermined granularity when a band correction packet in a band smaller than the band of predetermined granularity at which the packet is shaped is input.

As described above, the packet generation circuit 1b of the transmission apparatus generates a band correction packet in a band smaller than the band of predetermined granularity at which the packet is shaped and inputs the band correction packet to the shaping circuit 1a. Because of this, it becomes possible for the shaping circuit 1a to set a shaping rate finer than the band of predetermined granularity, and thus it is possible to eliminate the difference between the band after the packet shaping and the physical line band.

(Second Embodiment)

Next, a second embodiment is explained in detail with reference to the drawings.

Figure 2:
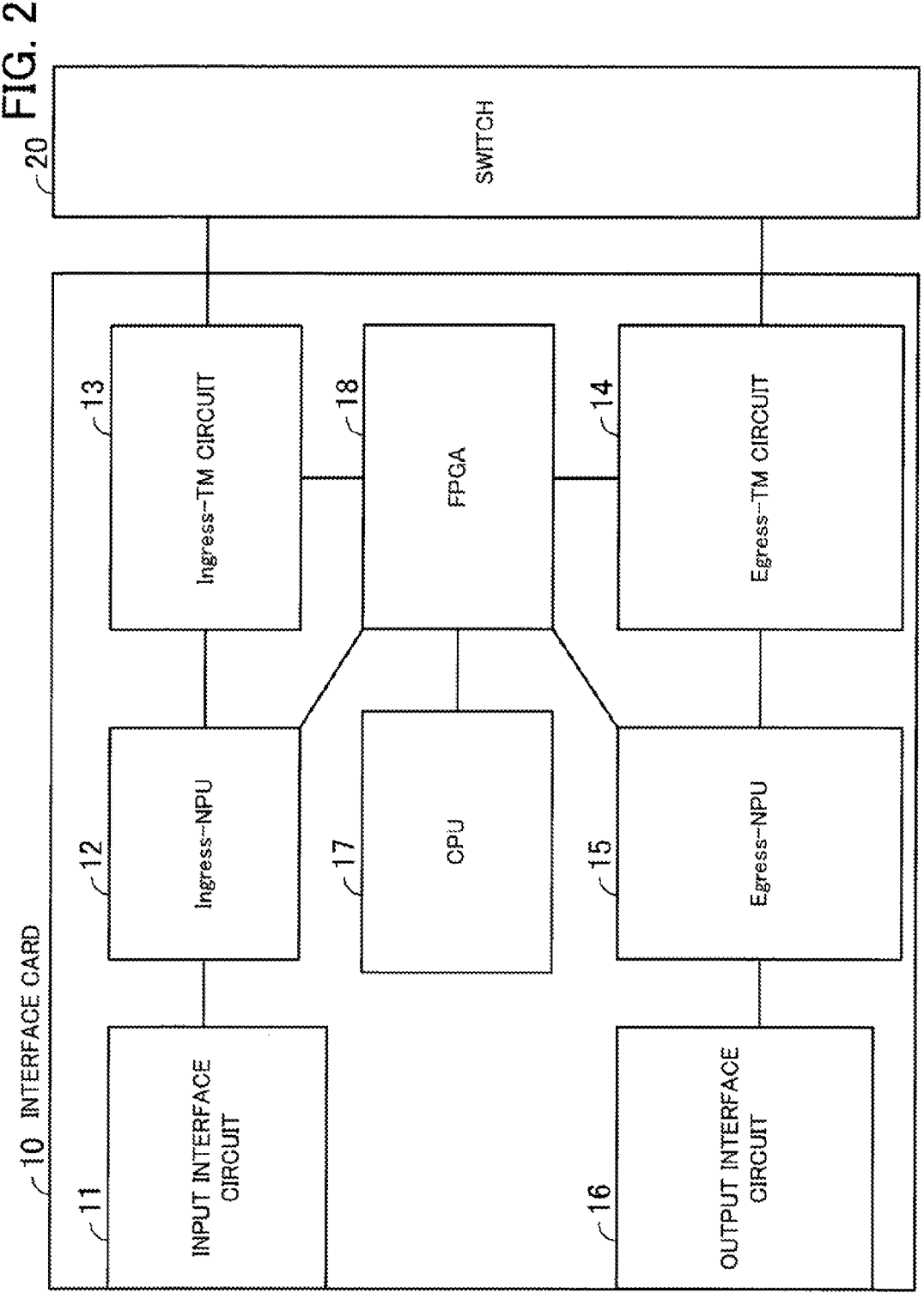
FIG. 2 illustrates an example of a hardware block of a transmission apparatus according to a second embodiment.

FIG. 2 illustrates an example of a hardware block of a transmission apparatus according to the second embodiment. As illustrated in FIG. 2, the transmission apparatus has an interface card 10 and a switch 20. In FIG. 2, only one interface card 10 is illustrated, but two or more may exist. The transmission apparatus is, for example, a layer 2 switch applied to the SONET (Synchronous Optical Network)/SDH (Synchronous Digital Hierarchy) network or the Ethernet (registered trademark) over SONET/SDH network.

The interface card 10 receives a packet from a physical line and outputs the packet to the switch 20. The switch 20 switches the path of the packet to another and outputs the packet to a predetermined interface. The interface card 10 outputs the packet, the path of which is switched to another by the switch 20, to the physical line.

The interface card 10 has an input interface circuit 11, an Ingress-NPU (Network Processing Unit) 12, an Ingress-TM (Traffic Management) circuit 13, an Egress-TM circuit 14, an Egress-NPU 15, an output interface circuit 16, a CPU (Central Processing Unit) 17, and an FPGA (Field Programmable Gate Array) 18. Each part of the interface card 10 is formed by, for example, a semiconductor chip including an integrated circuit.

The input interface circuit 11 receives a packet from the physical line.

The Ingress-NPU 12 is a processor which, for example, performs classification (filtering, identification of the kind of packets, sorting, etc.) the packet received by the input interface circuit 11 and performs packet processing such as the removal of a VLAN (Virtual Local Area Network) tag and the giving of meta data within the apparatus, depending on use application.

The Ingress-TM circuit 13 stores a packet output from the Ingress-NPU 12 in a queue (queue prepared for each interface card of the packet output destination and each interface of the packet output destination) for each output line (physical line of the packet output destination) referred to as a VOQ (Virtual Output Queue), and thus a packet destined for a certain output line is prevented from affecting another packet destined for another output line. The queue is a buffer having a capacity for temporarily storing a packet and realized by a memory such as a DRAM (Dynamic Random Access Memory) and an SRAM (Static Random Access Memory). Furthermore, the Ingress-TM circuit 13 outputs a packet to the switch 20 while controlling priority of sending the packet for each priority class of the packet.

The switch 20 switches a packet output from, for example, the Ingress-TM circuit of a plurality of interface cards, to the Egress-TM circuit of the interface card to which the packet is desired to be sent.

The Egress-TM circuit 14 shapes the packet switched by the switch 20 in a band of predetermined granularity. For example, the Egress-TM circuit 14 stores the packet in a queue for each traffic class corresponding to each output line and manages the amount of sending traffic of shaping.

The Egress-NPU 15 is a processor which performs various kinds of processing on the packet output from the Egress-TM circuit 14, such as filtering, sorting, adding a VLAN tag thereto, and changing the VLAN tag. Furthermore, the Egress-NPU 15 disposes of the band correction packet output from the Egress-TM circuit 14.

The output interface circuit 16 outputs a packet to the Ethernet line such as 1GE, and a VCAT (Virtual Concatenation) line such as E1-Xv. Although the output interface circuit 16 includes an FIFO buffer, the FIFO buffer does not sort the packet in accordance with the traffic class and disposes of the packet indiscriminately when the packet overflows.

The CPU 17 controls the whole of the interface card 10. The CPU 17 controls each part of the interface card 10 via the FPGA 18.

The FPGA 18 acts as an intermediary between the CPU 17 and each part of the interface card 10 for data transmission and reception. Furthermore, the FPGA 18 generates a band correction packet for eliminating the difference between the output band of the Egress-TM circuit 14 (band after the packet shaping in the Egress-TM circuit 14) and the physical line band based on the instruction of the CPU 17. The FPGA 18 outputs the generated band correction packet to the Ingress-TM circuit 13 or to the Egress-TM circuit 14 based on the instruction of the CPU 17.

Figure 3:
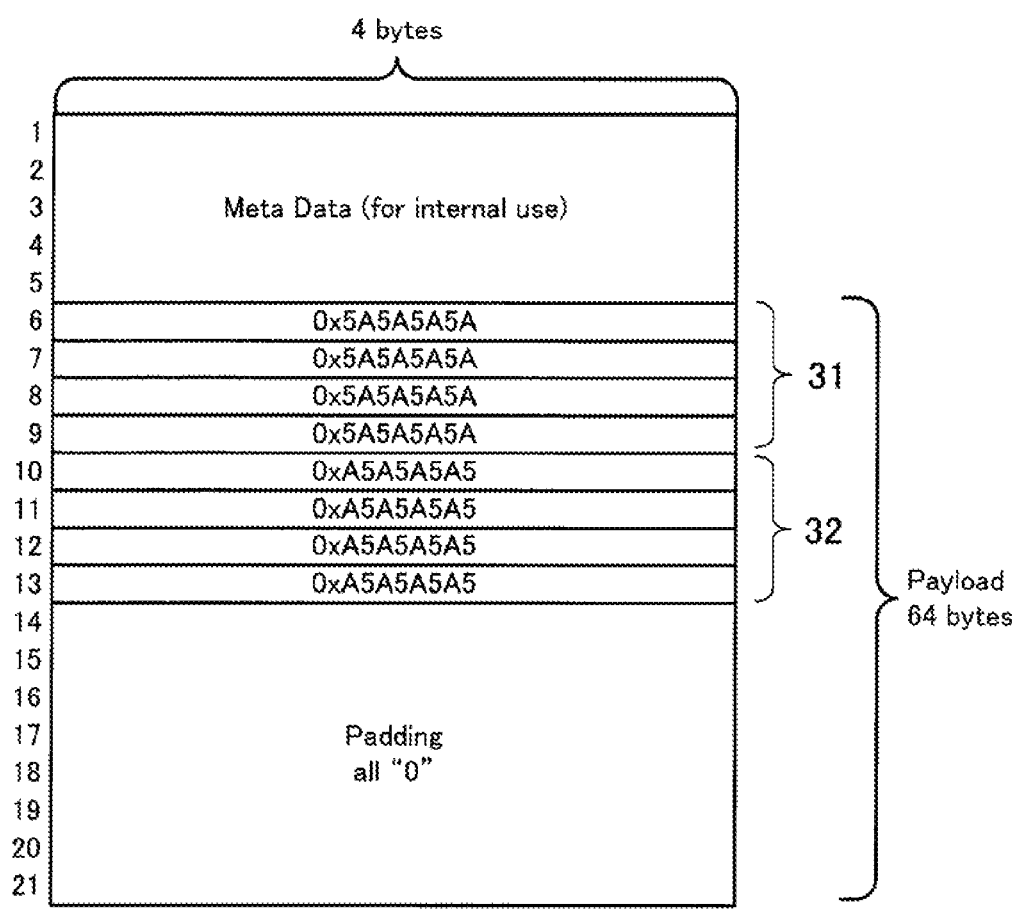
FIG. 3 illustrates a format example of a band correction packet.

FIG. 3 illustrates a format example of a band correction packet. As illustrated in FIG. 3, the band correction packet has a meta data region of 20 bytes and a payload region of 64 bytes.

In the meta data region, header information used for control of the interface card 10 is stored. For example, in the meta data region, information about flow type, traffic class, target IF-Card ID, target TM queue ID, and flag is stored.

<Flow Type>

The flow type is information for selecting a transmission path within the interface card 10 of a band correction packet. For example, the flow type indicates whether the band correction packet generated in the FPGA 18 is output to the Ingress-TM circuit 13 or to the Egress-TM circuit 14.

For example, when the flow type indicates information to the effect that 'the band correction packet is output to the Ingress-TM circuit 13', the band correction packet generated in the FPGA 18 is output to the Ingress-TM circuit 13. Meanwhile, the band correction packet output to the Ingress-TM circuit 13 follows the path of the switch 20, the Egress-TM circuit 14, and the Egress-NPU 15 and is disposed of at the Egress-NPU 15.

Furthermore, when the flow type indicates information to the effect that 'the band correction packet is output to the Egress-TM circuit 14', the band correction packet generated in the FPGA 18 is output to the Egress-TM circuit 14. Meanwhile, the packet output to the Egress-TM circuit 14 is output to the Egress-NPU 15 and disposed of at the Egress-NPU 15.

<Traffic Class>

The traffic class indicates the priority of a band correction packet. The traffic class of a band correction packet is set to the highest priority class. That is, a band correction packet input to the Egress-TM circuit 14 is not disposed of, but is output to the Egress-NPU 15.

<Target IF-Card ID>

The target IF-Card ID indicates the interface card of the output destination of a band correction packet.

<Target TM Queue ID>

The target TM queue ID indicates a queue number possessed by the Egress-TM circuit 14. The Egress-TM circuit 14 has a queue corresponding to the physical line of the output destination, to be explained below. The target TM queue ID indicates the queue number of the Egress-TM circuit 14 in which a band correction packet is stored.

<Flag>

The flag indicates that the packet is a band correction packet. Because of this, it is possible for the Egress-NPU 15 to determine whether or not the packet output from the Egress-TM circuit 14 is a band correction packet.

In a region 31 of the payload region, a health check pattern 1 of 16 bytes is stored. In a region 32, a health check pattern 2 of 16 bytes is stored. The health check patterns 1 and 2 take fixed values, for example, values of '0x5A5A . . . 5A' and '0x A5A5 . . . A5', respectively.

It is possible for the Egress-NPU 15 which finally receives a band correction packet to perform an error check of the path through which the band correction packet has propagated by the health check patterns 1 and 2. Meanwhile, the band correction packet is a packet which is completed within the transmission apparatus, and thus CRC-32 etc., such as the Ethernet frame, is not added and processing is simplified by the health check patterns 1 and 2.

In the rest of the payload region, padding for achieving a length of 64 bytes of the payload region is stored. For example, in the rest of the payload region, '0' is stored. Meanwhile, the length of the payload region may not be 64 bytes. For example, it may also be possible to vary the length depending on the band within the transmission apparatus through which the band correction packet propagates.

Figure 4:
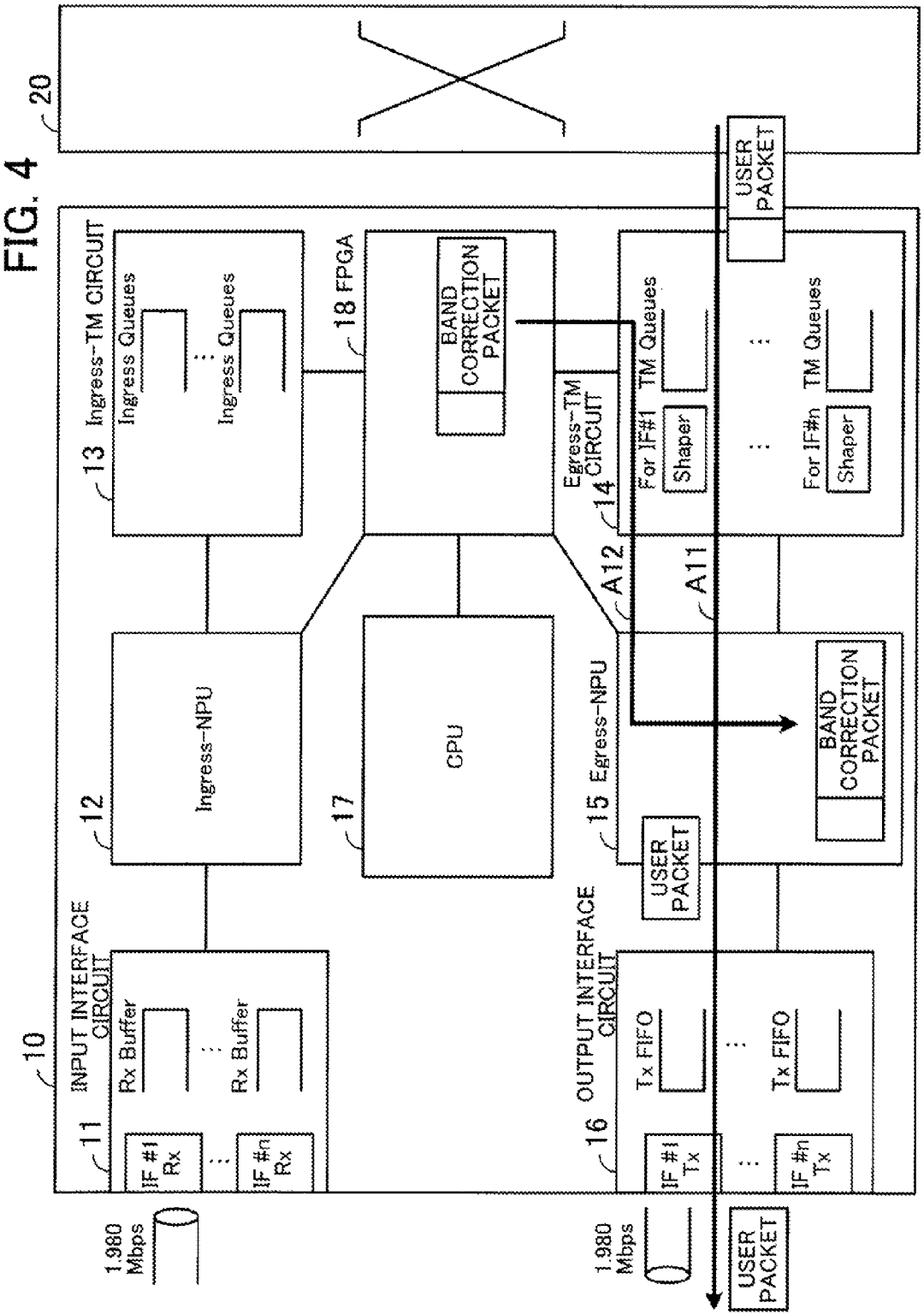
FIG. 4 is a diagram (Part 1) for explaining an operation of a transmission apparatus.

FIG. 4 is a diagram (Part 1) for explaining the operation of the transmission apparatus. In FIG. 4, the operation when the band correction packet generated in the FPGA 18 is output to the Egress-TM circuit 14 will be explained. In FIG. 4, the same symbol is attached to the same element as that in FIG. 2 and its explanation will be omitted. An arrow A11 illustrated in FIG. 4 indicates the path of a user packet, the path of which is switched to another by the switch 20. An arrow A12 indicates the path of the band correction packet generated by the FPGA 18.

The input interface circuit 11 has n interfaces (IF #1 Rx to IF #n Rx in FIG. 4) which receive packets corresponding to the physical line. Furthermore, the input interface circuit 11 has n reception buffers (Rx Buffer in FIG. 4) corresponding to the interfaces which receive packets.

The Ingress-TM circuit 13 has n queues (Ingress Queues in FIG. 4). The Ingress-NPU 12 outputs the packet output from the input interface circuit 11 to a predetermined queue of the Ingress-TM circuit 13. The packet stored in the queue of the Ingress-TM circuit 13 is stored in a predetermined queue of the Egress-TM circuit of a predetermined interface card by the switch 20.

The Egress-TM circuit 14 has n queues (TM Queues in FIG. 4) in correspondence to the physical line of the output destination of the output interface circuit 16. Furthermore, the Egress-TM circuit 14 has n shapers (Shaper in FIG. 4) in correspondence to the physical line of the output destination of the output interface circuit 16. Each of the n shapers acquires a packet having high priority of the traffic class from the corresponding queue based on the token bucket algorithm and outputs the packet to the Egress-NPU 15.

The output interface circuit 16 has an FIFO buffer (Tx FIFO in FIG. 4) in correspondence to the physical line of the output destination. Furthermore, the output interface circuit 16 has n interfaces (IF #1 Tx to IF #n Tx) in correspondence to the physical line of the output destination.

Here, the physical line band connected to the transmission apparatus is set to 1.980 Mbps, the granularity of shaping of the Egress-TM circuit 14 is set to 500 kbps, and the shaper setting rate of the Egress-TM circuit 14 is set to 2.0 Mbps. Furthermore, it is assumed that in the flow type of the meta data of the band correction packet generated by the FPGA 18, information to the effect that 'output destination is the Egress-TM circuit 14' is stored. In this case, the band correction packet generated by the FPGA 18 is output to the Egress-TM circuit 14 and is received by the Egress-NPU 15, as indicated by the arrow A12.

The meta data of a band correction packet includes a flag indicating that the packet is a band correction packet as explained in FIG. 3. The Egress-NPU 15 recognizes that the received packet is a band correction packet based on the flag included in the meta data of the band correction packet and disposes of the packet. Because of this, the band correction packet is not output to the physical line via the output interface circuit 16. The user packet output from the switch 20 is output to the physical line via the Egress-TM circuit 14, the Egress-NPU 15, and the output interface circuit 16 as indicated by the arrow A11.

The FPGA 18 sends a band correction packet in the band of the difference between the shaper setting rate of the Egress-TM circuit 14 (band of the packet output from the Egress-TM circuit 14) and the physical line band. For example, according to the above-mentioned example, the shaper setting rate of the Egress-TM circuit 14 is 2.0 Mbps and the physical line band is 1,980 kbps, and thus the FPGA 18 sends a band correction packet in a band of 20 kbps. More specifically, the packet length of the band correction packet is 64 bytes, and thus the FPGA 18 sends the band correction packet at a period of 25.6 ms (39.1 fps).

The band correction packet sent from the FPGA 18 to the Egress-TM circuit 14 is stored in a predetermined queue of the Egress-TM circuit 14 based on the target TM queue ID of the meta data. For example, when the target TM queue ID indicates '#1', the band correction packet is stored in TM Queues corresponding to Shaper of For IF #1 (the uppermost TM Queues of the Egress-TM circuit 14) illustrated in FIG. 4.

The traffic class of the band correction packet generated by the FPGA 18 is the highest priority class as explained in FIG. 3. Consequently, the shaper of the Egress-TM circuit 14 outputs most preferentially the band correction packet stored in the queue to the Egress-NPU 15. Because of this, 20 kbps of 2.0 Mbps of the shaper setting rate is consumed by the band correction packet. That is, the band of the user packet output from the Egress-TM circuit 14 is 1.980 Mbps. For example, from Shaper of For IF #1, a user packet of 1.980 Mbps is output.

As described above, the band correction packet is disposed of at the Egress-NPU 15. Consequently, from the Egress-NPU 15, no band correction packet is output but user data of 1.980 Mbps is output to the output interface circuit 16. Because of this, it is possible to avoid the disposal of a packet because of the overflow of the packet in the output interface circuit 16. Furthermore, it is possible to fully use the band of 1,980 kbps of the physical line.

The Egress-NPU 15 checks the health check pattern of the band correction packet when disposing of the band correction packet. For example, the Egress-NPU 15 checks whether or not the health check patterns 1 and 2 of the received band correction packet are '0x5A5A . . . 5A' and '0xA5A5 . . . A5', respectively. When the health check patterns 1 and 2 are not the values described above, the Egress-NPU 15 recognizes that there exists anomaly in the path through which the band correction packet has propagated. For example, the Egress-NPU 15 recognizes that anomaly exists in the path between the Egress-TM circuit 14 and the Egress-NPU 15.

Figure 5:
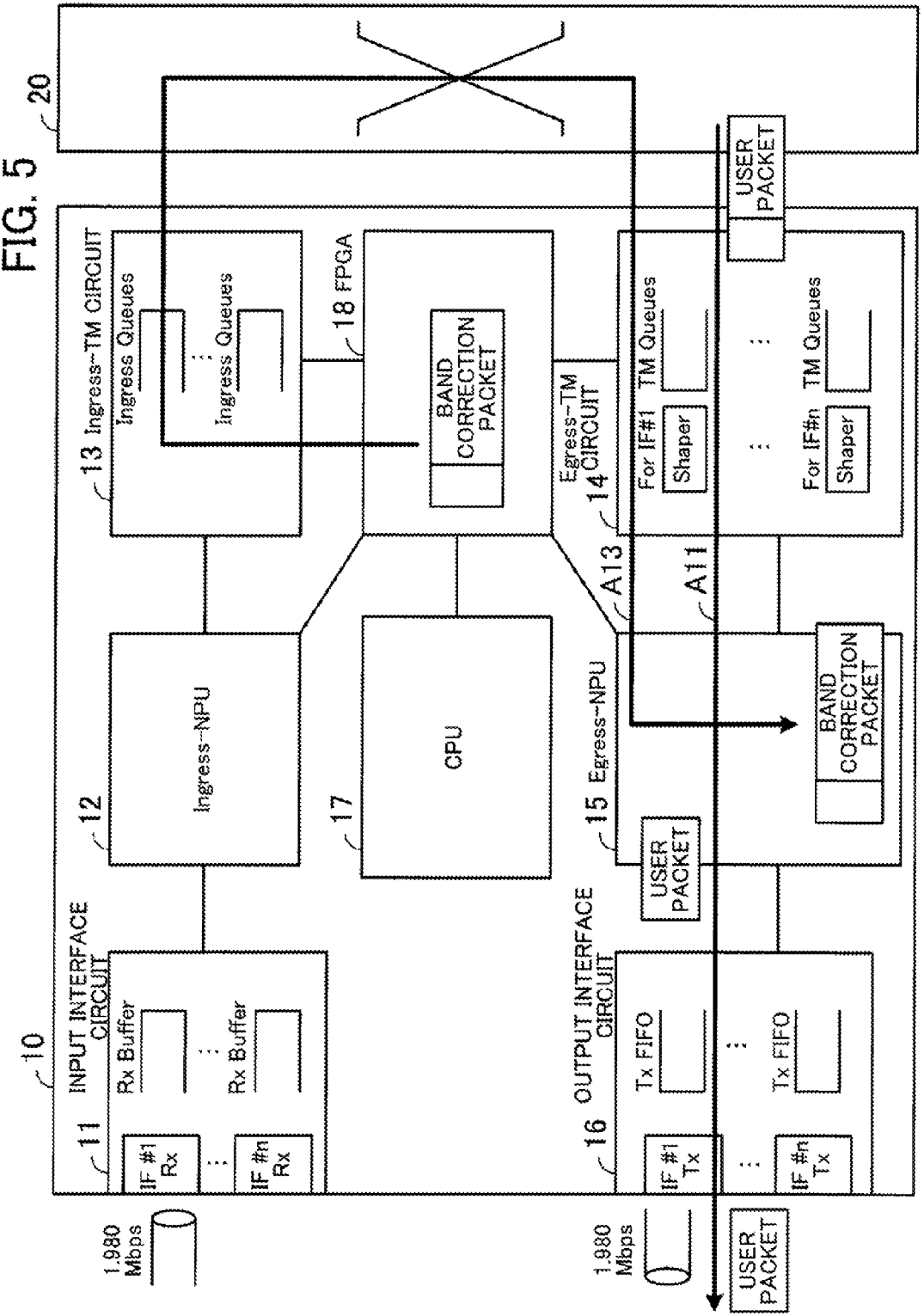
FIG. 5 is a diagram (Part 2) for explaining the operation of the transmission apparatus.

FIG. 5 is a diagram (Part 2) for explaining the operation of the transmission apparatus. In FIG. 5, the operation when the band correction packet generated in the FPGA 18 is output to the Ingress-TM circuit 13 will be explained. In FIG. 5, the same symbol is attached to the same element as that in FIG. 4 and its explanation will be omitted. In FIG. 5, the packet generated in the FPGA 18 is output to the Ingress-TM circuit 13 and output to the Egress-TM circuit 14 via the switch 20, as indicated by an arrow A13.

The FPGA 18 sets ID of the interface card 10 to the target IF-Card ID of the meta data of the band correction packet to be generated. Because of this, the band correction packet output from the FPGA 18 to the Ingress-TM circuit 13 is received by the Egress-TM circuit 14 of the interface card 10 via the switch 20, as indicated by the arrow A13.

The band correction packet received by the Egress-TM circuit 14 is stored in a predetermined queue based on the target TM queue ID of the meta data. Meanwhile, the shaping processing of the Egress-TM circuit 14 is the same as that of FIG. 4, and thus its explanation will be omitted.

The Egress-NPU 15 checks the health check pattern of the band correction packet when disposing of the band correction packet. In the case of FIG. 5, the band correction packet is output to the Ingress-TM circuit 13 and received by the Egress-NPU 15 via the switch 20 and the Egress-TM circuit 14. Consequently, in the case of FIG. 5, it is possible for the Egress-NPU 15 to check anomaly in the path between the Ingress-TM circuit 13 and the Egress-NPU 15.

Figure 6:
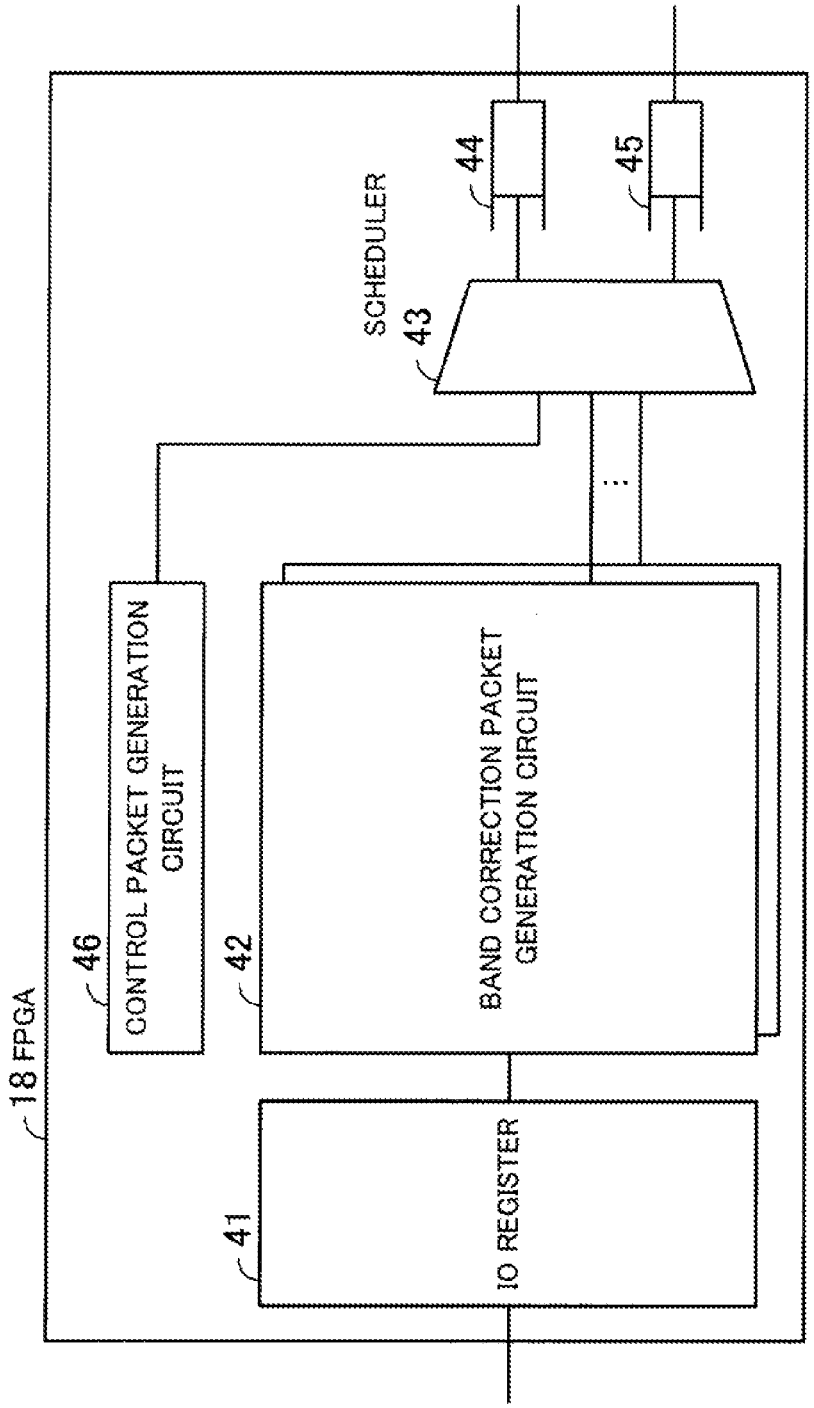
FIG. 6 illustrates an example of a functional block of an FPGA.

FIG. 6 illustrates an example of the functional block of FPGA. FIG. 6 illustrates the functional block of FPGA relating to packet generation. As illustrated in FIG. 6, the FPGA 18 has an IO (Input Output) register 41, a band correction packet generation circuit 42, a scheduler 43, FIFO buffers 44 and 45, and a control packet generation circuit 46.

To the IO register 14, parameters are set by the CPU 17. Parameters set by the CPU 17 are the meta data explained in FIG. 3 (flow type, traffic class, target IF-Card ID, target TM queue ID, and flag).

Furthermore, parameters to be set to the IO resister 41 by the CPU 17 include information indicating that sending of band correction packet is enabled or disabled. Moreover, parameters to be set to the IO resister 41 by the CPU 17 include a send period of band correction packet.

The band correction packet generation circuit 42 generates a band correction packet in response to an instruction from the IO resister 41. For example, the band correction packet generation circuit 42 generates the band correction packet explained in FIG. 3.

The band correction packet generation circuit 42 is provided in plurality in correspondence to the queues possessed by the Egress-TM circuit 14. For example, the n band correction packet generation circuits 42 are provided in correspondence to n Queues corresponding to For IF #1 to For IF #n illustrated in FIG. 4.

The scheduler 43 outputs band correction packets output from the n band correction packet generation circuits 42 and a control packet output from the control packet generation circuit 46 to any one of the FIFO buffer 44 and the FIFO buffer 45 based on a predetermined scheduling.

For example, when information to the effect that 'output destination is the Ingress-TM circuit 13' is stored in the flow type of the meta data of the band correction packet, the scheduler 43 outputs the packets to the FIFO buffer 44. When information to the effect that 'output destination is the Egress-TM circuit 14' is stored in the flow type of the meta data of the band correction packet, the scheduler 43 outputs the packets to the FIFO buffer 45. The scheduling method of the scheduler 43 is, for example, round-robin scheduling.

The FIFO buffer 44 temporarily holds the band correction packet or the control packet output from the scheduler 43 and outputs the packet to the Ingress-TM circuit 13. The FIFO buffer 45 temporarily holds the band correction packet or the control packet output from the scheduler 43 and outputs the packet to the Egress-TM circuit 14.

The control packet generation circuit 46 generates, for example, a packet or the like for monitoring a transmission path.

Figure 7:
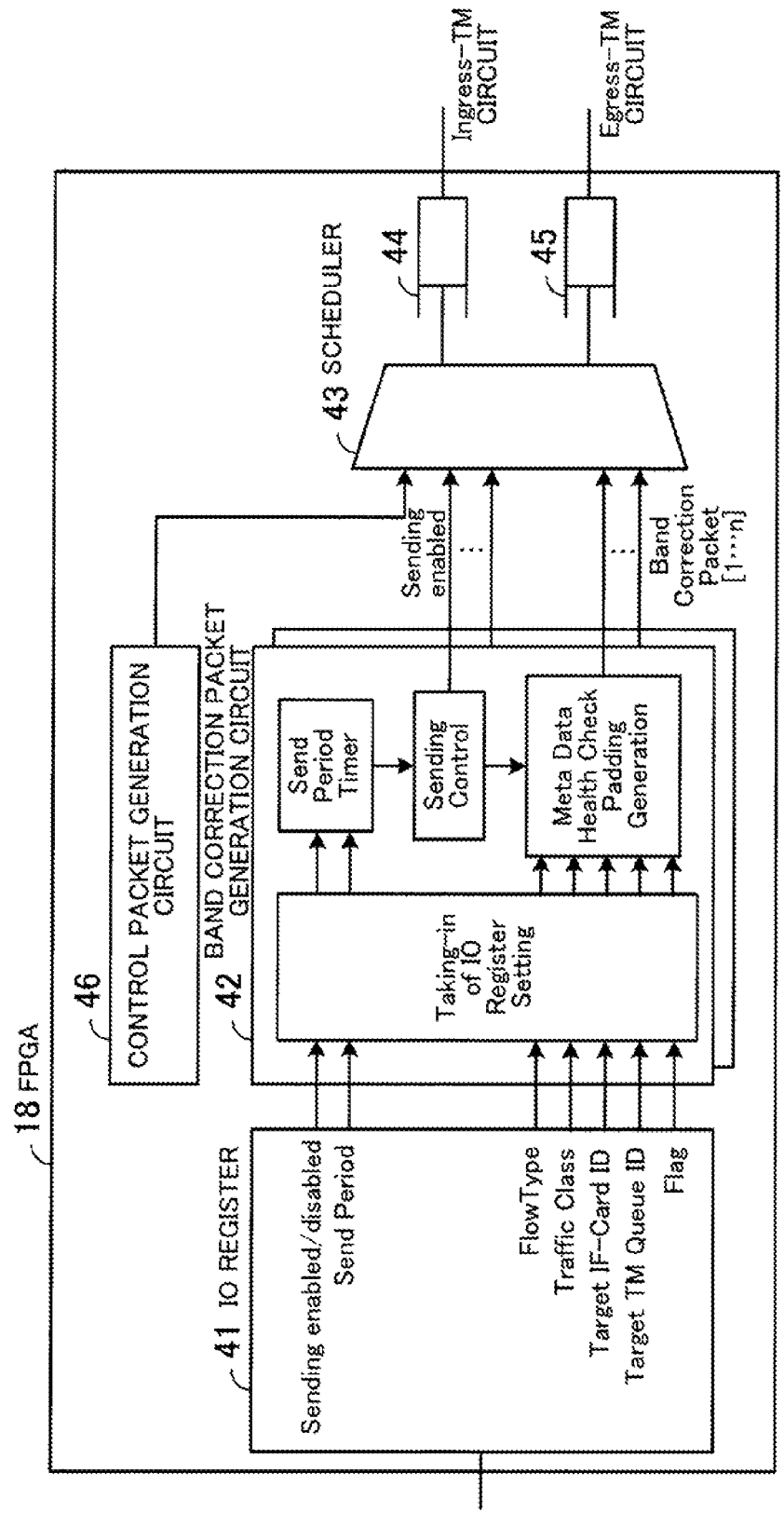
FIG. 7 is a diagram for explaining an operation of the FPGA.

FIG. 7 explains the operation of FPGA. In FIG. 7, the same symbol is attached to the same element as that in FIG. 6 and its explanation will be omitted.

To the IO resister 41, parameters used to generate meta data of a band correction packet are set by the CPU 17. Flow Type, Traffic Class, Target IF-Card ID, Target TM Queue ID, and Flag in FIG. 7 indicate parameters to be set by the CPU 17 and the flow type, traffic class, target IF-Card ID, target TM queue ID, and flag explained in FIG. 3 correspond thereto.

To the IO resister 41, a parameter indicating that sending of band correction packet is enabled or disabled and a parameter of the send period of band correction packet (Sending enabled/disabled and Send period in FIG. 7) are set.

The parameters set to the IO resister 41 are taken into the band correction packet generation circuit 42. The band correction packet generation circuit 42 generates meta data of a band correction packet, based on the flow type, traffic class, target IF-Card ID, target TM queue ID, and flag of the parameters that are taken thereinto. In addition, the band correction packet generation circuit 42 generates a health check pattern of band correction packet. Moreover, the band correction packet generation circuit 42 generates padding of band correction packet.

Furthermore, the band correction packet generation circuit 42 sets the send period of the parameter that is taken thereinto to a timer (Send period timer in FIG. 7). When the parameter indicating that sending is enabled or disabled is enabled, the band correction packet generation circuit 42 outputs the band correction packet generated to the scheduler 43, based on the count value of the timer. For example, the band correction packet generation circuit 42 outputs the band correction packet generated to the scheduler 43 each time the count value of the timer becomes 0. When the parameter indicating that sending is enabled or disabled is disabled, the band correction packet generation circuit 42 does not output the band correction packet generated to the scheduler 43.

To the scheduler 43, n band correction packets are input from the n band correction packet generation circuits 42. '1 ... n' of the band correction packets (1 ... n) illustrated in FIG. 7 corresponds to '1 ... n' of For IF #1 ... For IF #n of the Egress-TM circuit 14 illustrated in FIG. 4 and FIG. 5.

Furthermore, to the scheduler 43, a signal indicating that sending of band correction packet is enabled or disabled (Sending enabled in FIG. 7) is input from the band correction packet generation circuit 42. When a signal indicating that sending is enabled is input, the scheduler 43 outputs the band correction packet output from the band correction packet generation circuit 42 to the FIFO buffers 44 and 45 by, for example, round-robin scheduling.

Figure 8:
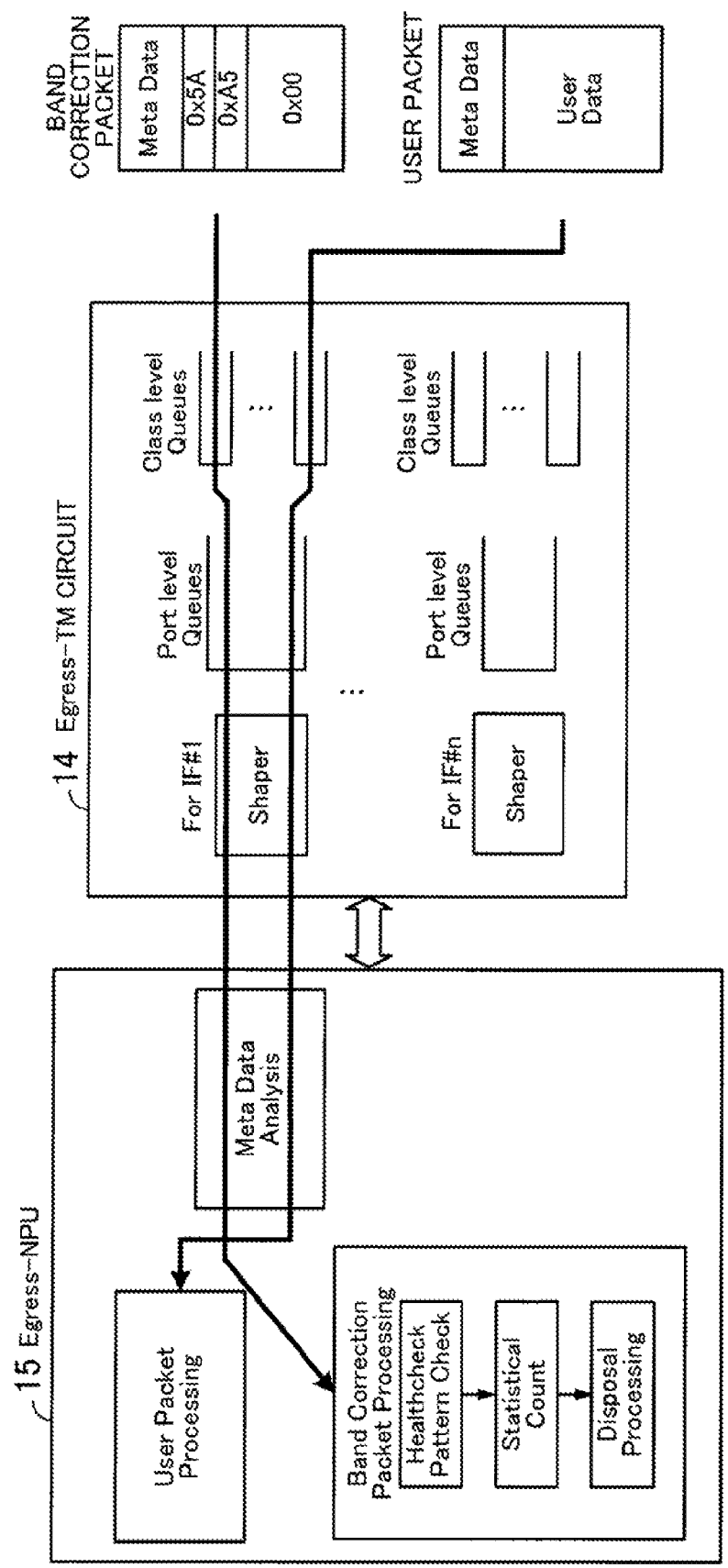
FIG. 8 explains operations of an Egress-TM circuit and an Egress-NPU.

FIG. 8 explains the operation of the Egress-TM circuit and the Egress-NPU. FIG. 8 illustrates the Egress-TM circuit 14 and the Egress-NPU 15 explained in FIG. 2, FIG. 4, and FIG. 5. Furthermore, FIG. 8 illustrates a band correction packet and a user packet, to be input to the Egress-TM circuit 14.

Class level Queues and Port level Queues illustrated in the Egress-TM circuit 14 of FIG. 8 correspond to TM Queues illustrated in FIG. 4 and FIG. 5. Furthermore, Shaper illustrated in the Egress-TM circuit 14 of FIG. 8 corresponds to Shaper illustrated in FIG. 4 and FIG. 5.

A plurality of Class level Queues corresponding to Shaper of For IF #1 ... For IF #n, respectively, corresponds to the traffic class. For example, the uppermost queue of the plurality of Class level Queues corresponding to Shaper of For IF #1 in FIG. 8 corresponds to the traffic class having the highest priority. The lowermost queue of the plurality of Class level Queues corresponding to Shaper of For IF #1 corresponds to the traffic class having the lowest priority.

The band correction packet is stored in Class level Queues corresponding to Shaper of For IF #1 ... For IF #n based on the target TM queue ID included in the meta data. For example, the band correction packet is stored in Class level Queues corresponding to Shaper of For IF #1 as illustrated in FIG. 8.

Moreover, since the priority of the traffic class is highest, the band correction packet is stored in Class level Queues having the highest priority. For example, as illustrated in FIG. 8, the band correction packet is stored in the uppermost queue of the plurality of Class level Queues corresponding to Shaper of For IF #1.

Meanwhile, in the example of FIG. 8, the user packet is stored in the lowermost queue of the plurality of Class level Queues corresponding to Shaper of For IF #1. That is, the priority of the traffic class of the user packet illustrated in FIG. 8 is lowest.

Shaper illustrated in FIG. 8 outputs the band correction packet and the user data to the Egress-NPU 15 so that a predetermined shaper setting rate is obtained based on the set granularity. At this time, Shaper stores the band correction packet and the user data from Class level Queues to Port level Queues in order from the highest priority, and outputs the band correction packet and user data to the Egress-NPU 15.

The Egress-NPU 15 analyzes the meta data of the band correction packet and the user packet output from the Egress-TM circuit 14. For example, the Egress-NPU 15 determines whether the packet output from the Egress-TM circuit 14 is a band correction packet or user packet, based on the flag included in the meta data. When the packet output from the Egress-TM circuit 14 is a user packet, the Egress-NPU 15 performs user packet processing such as filtering and sorting the user packet, and adding and changing a VLAN tag.

Furthermore, when the packet output from the Egress-TM circuit 14 is a band correction packet, the Egress-NPU 15 performs band correction packet processing. For example, the Egress-NPU 15 checks the health check pattern of the band correction packet. For example, the Egress-NPU 15 checks whether or not the health check patterns of '0x5A5A ... 5A' and '0xA5A5 ... A5' are stored in the regions 31 and 32 of the band correction packet of FIG. 3.

The Egress-NPU 15 takes the statistics about the number of errors of the health check pattern of the band correction packet. For example, the Egress-NPU 15 counts how many times the error of the health check pattern of the band correction packet has occurred. After taking the statistics about the number of errors of the health check pattern of the band correction packet, the Egress-NPU 15 disposes of the band correction packet.

Figure 9:
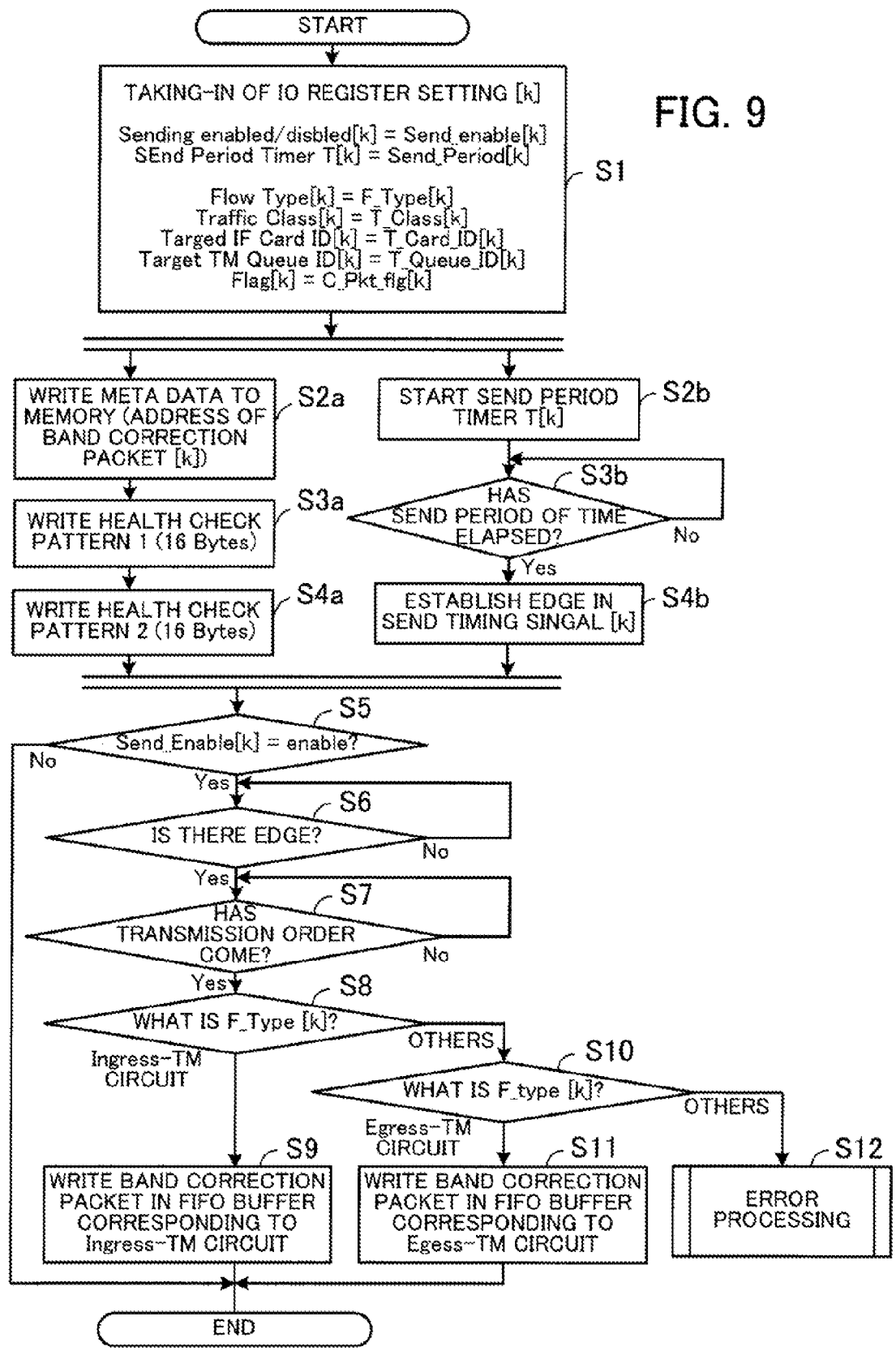
FIG. 9 is a flowchart of an example of an operation of generating a band correction packet.

FIG. 9 is a flowchart of an example of the generation operation of a band correction packet. The flowchart of FIG. 9 is performed for each band correction packet k (k=1 ... n). For example, n corresponds to n illustrated in FIG. 7.

(Step S1) The band correction packet generation circuit 42 takes in the register value of the IO resistor 41. For example, the band correction packet generation circuit 42 stores the value on the left side of the expression illustrated in step S1 of FIG. 9 (value set to the IO resistor 41, for example, the parameter illustrated within the frame of the IO resistor 41 in FIG. 7) into the variable on the right side.

(Step S2a) The band correction packet generation circuit 42 writes the IO register value taken in from the IO resistor 41 to the memory (the address corresponding to the band correction packet (k)).

(Step S3a) The band correction packet generation circuit 42 writes the health check pattern 1 to the memory.

(Step S4a) The band correction packet generation circuit 42 writes the health check pattern 2 to the memory.

(Step S2b) The band correction packet generation circuit 42 starts a send period timer T (k) at the count value of Send_Period (k).

(Step S3b) The band correction packet generation circuit 42 determines whether or not the send period of the band correction packet (k) is reached based on the count value of the send period timer T (k). For example, the band correction packet generation circuit 42 determines that the send period of the band correction packet (k) is reached when the count value of the send period timer T (k) is counted down from the value of Send_Period (k) and reaches 0. When the send period of the band correction packet (k) is reached, the band correction packet generation circuit 42 proceeds to step S4b. When the send period of the band correction packet (k) is not reached yet, the band correction packet generation circuit 42 repeats the processing of step S3b.

(Step S4b) The band correction packet generation circuit 42 specifies an edge in a send timing signal (k). For example, the band correction packet generation circuit 42 stores '1' in the send timing signal (k).

Meanwhile, the processing of steps S2a to S4a and the processing of steps S2b to S4b are performed in parallel.

(Step S5) The band correction packet generation circuit 42 determines whether or not Send Enable (k) is enabled. When Send_Enable (k) is disabled, the band correction packet generation circuit 42 terminates the processing. When Send_Enable (k) is enabled, the band correction packet generation circuit 42 proceeds to step S6.

(Step S6) The band correction packet generation circuit 42 determines whether or not an edge is sharply defined in the send timing signal (k). When an edge is sharply defined in the send timing signal (k), the band correction packet generation circuit 42 proceeds to step S7. When no edge is sharply defined in the send timing signal (k), the band correction packet generation circuit 42 repeats the processing of step S6.

(Step S7) The scheduler 43 determines whether or not the transmission order of the band correction packet (k) generated in the band correction packet generation circuit 42 has come. The scheduler 43 determines the transmission order of the generated band correction packet (k) by, for example, round-robin scheduling. When the transmission order of the generated band correction packet (k) has come, the scheduler 43 proceeds to step S8. When the transmission order of the generated band correction packet (k) has not come yet, the scheduler 43 repeats the processing of step S7.

(Step S8) The scheduler 43 determines whether or not F_Type (k) indicates information to the effect that 'output destination is the Ingress-TM circuit 13'. When F_Type (k) indicates information to the effect that 'output destination is the Ingress-TM circuit 13', the scheduler 43 proceeds to step S9. When F_Type (k) does not indicate information to the effect that 'output destination is the Ingress-TM circuit 13', the scheduler 43 proceeds to step S10.

(Step S9) The scheduler 43 writes the band correction packet to the FIFO buffer 44 corresponding to the Ingress-TM circuit 13. Because of this, the band correction packet (k) generated in the band correction packet generation circuit 42 is output to the Ingress-TM circuit 13.

(Step S10) The scheduler 43 determines whether or not F_Type (k) indicates information to the effect that 'output destination is the Egress-TM circuit 14'. When F_Type (k) indicates information to the effect that 'output destination is the Egress-TM circuit 14', the scheduler 43 proceeds to step S11. When F_Type (k) does not indicate information to the effect that 'output destination is the Egress-TM circuit 14', the scheduler 43 proceeds to step S12.

(Step S11) The scheduler 43 writes the band correction packet to the FIFO buffer 45 corresponding to the Egress-TM circuit 14. Because of this, the band correction packet (k) generated in the band correction packet generation circuit 42 is output to the Egress-TM circuit 14.

(Step S12) The FPGA 18 performs error processing. For example, the FPGA 18 notifies the CPU 17 of the fact that the band correction packet is not output normally.

Figure 10:
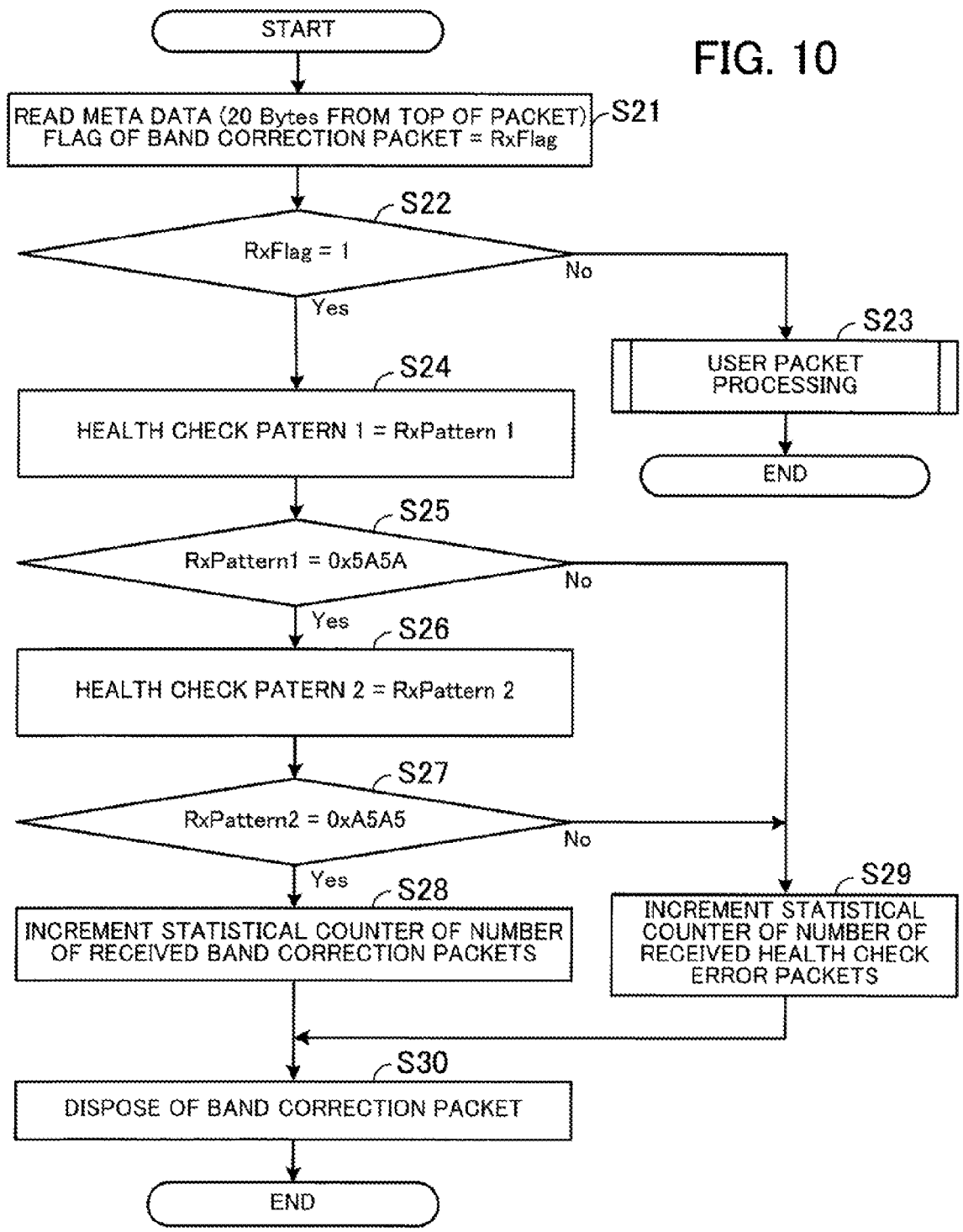
FIG. 10 is a flowchart of an example of an operation of disposing of a band correction packet.

FIG. 10 is a flowchart of an example of the operation of disposing of a band correction packet.

(Step S21) The Egress-NPU 15 reads the meta data of the received packet. For example, the Egress-NPU 15 reads 20 bytes from the top of the received packet. The Egress-NPU 15 reads the flag of the read meta data and stores the flag in RxFlag.

(Step S22) The Egress-NPU 15 determines whether or not RxFlag is '1'. That is, the Egress-NPU 15 determines whether or not the received packet is a band correction packet. When the received packet is a band correction packet, the Egress-NPU 15 proceeds to step S24. When the received packet is not a band correction packet, that is, when the received packet is a user packet, the Egress-NPU 15 proceeds to step S23.

(Step S23) The Egress-NPU 15 performs user packet processing on the received packet.

(Step S24) The Egress-NPU 15 stores the health check pattern 1 of the band correction packet in RxPattern 1.

(Step S25) The Egress-NPU 15 determines whether or not the pattern of RxPattern 1 is '0x5A5A . . . 5A'. When the pattern of RxPattern 1 is '0x5A5A . . . 5A', the Egress-NPU 15 proceeds to step S26. When the pattern of RxPattern 1 is not '0x5A5A . . . 5A', the Egress-NPU 15 proceeds to step S29.

(Step S26) The Egress-NPU 15 stores the health check pattern 2 of the band correction packet in RxPattern 2.

(Step S27) The Egress-NPU 15 determines whether or not the pattern of RxPattern 2 is '0xA5A5 . . . A5'. When the pattern of RxPattern 2 is '0xA5A5 . . . A5', the Egress-NPU 15 proceeds to step S28. When the pattern of RxPattern 2 is not '0xA5A5 . . . A5', the Egress-NPU 15 proceeds to step S29.

(Step S28) The Egress-NPU 15 increments the statistical counter which counts the number of received band correction packets, by one.

(Step S29) The Egress-NPU 15 increments the statistical counter which counts the number of received health check error packets, by one.

(Steps S30) The Egress-NPU 15 disposes of the band correction packet.

FIG. 11 explains an example of the shaping rate. The shaper setting rate in Table illustrated in FIG. 11 indicates the shaper setting rate to be set to the Egress-TM circuit 14 of FIG. 2. FIG. 11 illustrates a case where the shaper setting rate of '500 kbps' is set and another case where the shaper setting rate of '1,000 kbps' is set. It is assumed that granularity of the Egress-TM circuit 14 is 500 kbps.

The band correction packet rate illustrated in FIG. 11 illustrates the rate of the band correction packet output from the FPGA 18. The user packet rate illustrates the rate of the user packet output from the Egress-TM circuit 14.

For example, it is assumed that the shaper setting rate set to the Egress-TM circuit 14 is '500 kbps' and the rate of the band correction packet generated in the FPGA 18 is '450 kbps'. In this case, as illustrated in FIG. 11, a user packet of '50 kbps' is output from the Egress-TM circuit 14 as a result.

Furthermore, for example, it is assumed that the shaper setting rate set to the Egress-TM circuit 14 is '1,000 kbps' and the rate of the band correction packet generated in the FPGA 18 is '450 kbps'. In this case, as a result, as illustrated in FIG. 11, a user packet of '550 kbps' is output from the Egress-TM circuit 14.

As illustrated in FIG. 11 when the rate of the band correction packet generated by the FPGA 18 is varied at intervals of '50 kbps', it is possible to vary the output band of the user packet at intervals of '50 kbps'. That is, with the transmission apparatus of FIG. 2, it is possible to set the shaping rate at fine steps even when the granularity to be set is 500 kbps. That is, with the transmission apparatus of FIG. 2, it is possible to control the band of the user packet at finer levels and to adapt the band to the physical line band, by varying the rate of the band correction packet.

Furthermore, with the transmission apparatus of FIG. 2, it is possible to adapt the band of the user packet to the physical line band by varying the rate of the band correction packet, and thus it is possible to realize the flexibility of design and mounting of the apparatus.

Here, the operation of the transmission apparatus when no band correction packet is generated will be explained.

Figure 12:
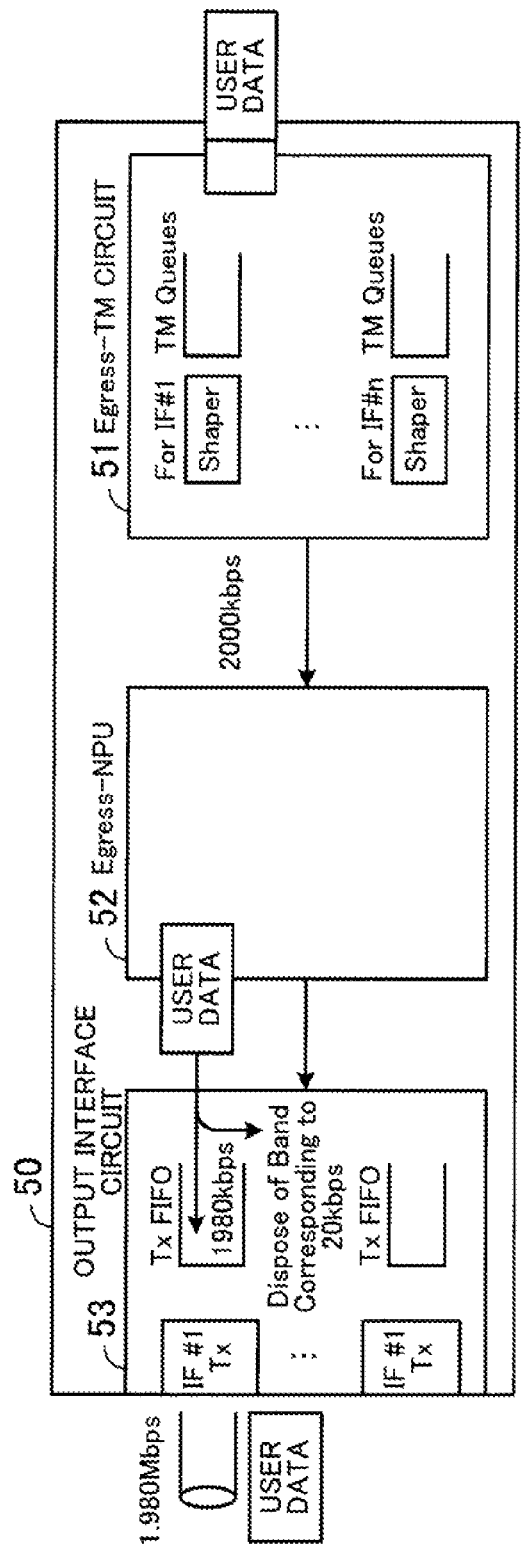
FIG. 12 is a diagram (Part 1) for explaining an operation of a transmission apparatus when no band correction packet is generated.

FIG. 12 is a diagram (Part 1) for explaining the operation of the transmission apparatus when no band correction packet is generated. As illustrated in FIG. 12, an interface card 50 has an Egress-TM circuit 51, an Egress-NPU 52, and an output interface circuit 53. In FIG. 12, the part of Ingress is not illustrated schematically.

In FIG. 12, the physical line band is set to 1.980 Mbps, the granularity of the Egress-TM circuit 51 is set to 500 kbps, and the shaper setting rate of the Egress-TM circuit 51 is set to 2,000 kbps.

In this case, from the Egress-TM circuit 51, a user packet of 2,000 kbps is output. In contrast to this, the physical line band is 1.980 Mbps, and thus the output interface circuit 53 disposes of the user packet of surplus 20 kbps indiscriminately at the TxFIFO buffer. That is, when no band correction packet is generated, there is a case where the user packet is disposed of.

Figure 13:
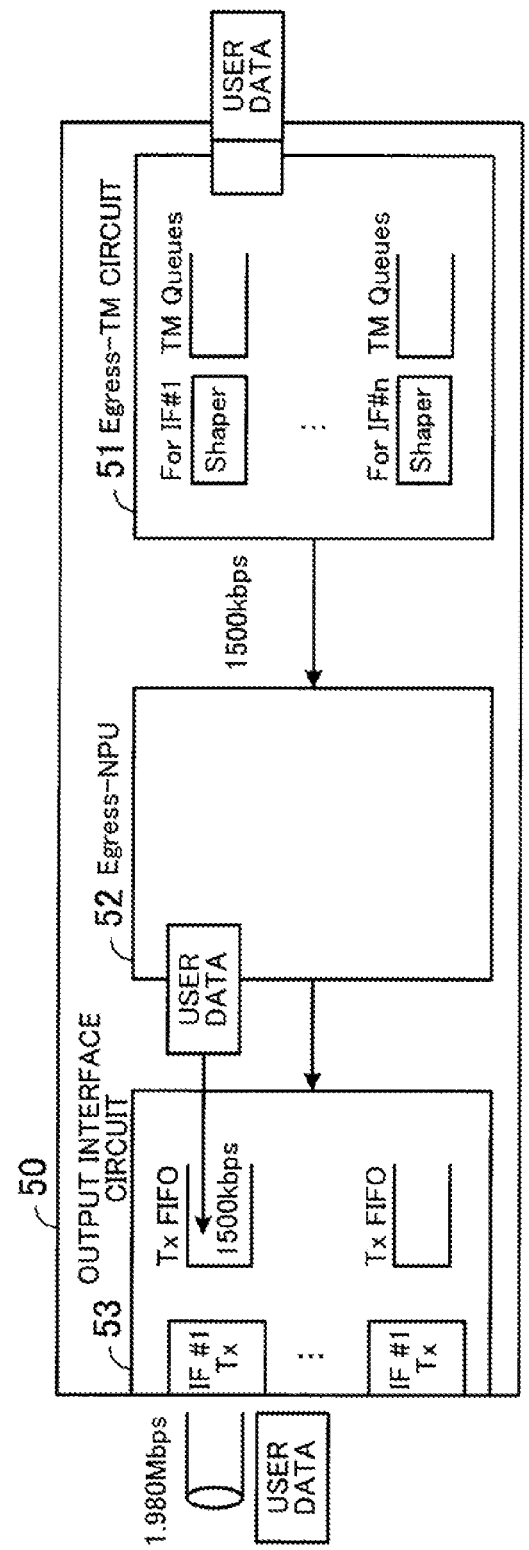
FIG. 13 is a diagram (Part 2) for explaining the operation of the transmission apparatus when no band correction packet is generated.

FIG. 13 is a diagram (Part 2) for explaining the operation of the transmission apparatus when no band correction packet is generated. In FIG. 13, the same symbol is attached to the same element as that in FIG. 12 and its explanation will be omitted.

In FIG. 13, the physical line band is set to 1.980 Mbps, the granularity of the Egress-TM circuit 51 is set to 500 kbps, and the shaper setting rate of the Egress-TM circuit 51 is set to 1,500 kbps.

In this case, the output band of the Egress-TM circuit 51 is short of 480 kbps as compared with the physical line band. Because of this, the physical line leaves the band corresponding thereto unused.

As explained in FIG. 12 and FIG. 13, when no band correction packet is generated, a difference arises between the output band of the Egress-TM circuit 51 and the physical line band, and the user packet is disposed of indiscriminately or the physical line band becomes surplus. In contrast to this, with the transmission apparatus of FIG. 2, it is possible to match the band of the user packet output from the Egress-TM circuit 51 with the physical line band.

The amount of sending band correction packets to the physical line of the transmission apparatus of FIG. 2 is explained.

FIG. 14 illustrates a setting example of the physical line and the amount of sending band correction packets. FIG. 14 illustrates a setting example of the amount of sending band correction packets when the physical line is E1-Xv (X=1 . . . 16). The granularity of the Egress-TM circuit 14 of the transmission apparatus of FIG. 2 is set to 500 kbps (granularity design appropriate for the setting range up to 10 Gbps) and the packet length of the band correction packet generated by the FPGA 18 is set to 64 bytes.

In box A of FIG. 14, the line band of E1-Xv is illustrated. In box B, the payload band of E1-Xv is illustrated. In box C, the shaper setting rate of the Egress-TM circuit 14 is illustrated. In box D, the send period of the band correction packet of the FPGA 18 is illustrated. In box E, the packet length of the band correction packet is illustrated. In box F, the rate of the band correction packet (packets/s) is illustrated. In box G, the rate of the band correction packet (kbps) is illustrated.

For example, in E1-1v, the shaper setting rate of the Egress-TM circuit 14 is set to 2,000 kbps, which is larger than 1,980 bps of the payload band. In this case, the FPGA 18 sends the band correction packet having a packet length of 64 bytes at a period of 25.6 ms as illustrated in box D and box G. As a result, to the Egress-TM circuit 14, the band correction packet of 20 kbps is input and from the Egress-TM circuit 14, the user packet of 1,980 kbps is output. Because of this, it is possible for the Egress-TM circuit 14 to perform the same shaping as that of the payload band, by the band correction packet generated by the FPGA 18.

As described above, the FPGA 18 generates a band correction packet in a band smaller than the band of predetermined granularity at which the packet of the Egress-TM circuit 14 is shaped and inputs the packet to the Egress-TM circuit 14. Because of this, it becomes possible for the Egress-TM circuit 14 to set a shaping rate finer than the band of predetermined granularity and it is possible to eliminate the difference between the band after the packet shaping and the physical line band.

Furthermore, it is possible for the Egress-TM circuit 14 to eliminate the difference between the band after the packet shaping and the physical line band, and thus it is no longer necessary for the output interface circuit 16 to dispose of the user packet. In addition, it is possible for the transmission apparatus to output the user packet to the physical line by using the full physical line band.

Moreover, it is also possible for the Egress-TM circuit 14 to eliminate the difference between the band after the packet shaping and the physical line band by making the granularity finer by, for example, hardware. However, recently when higher transmission capacity progresses, a setting range of 10 Gbps or more is demanded, and thus the finer granularity is made, the more difficult the device design and setting become and the higher the costs become.

Furthermore, it is considered that, for example, a back pressure function between the Egress-TM circuit 14 and the output interface circuit 16 is mounted. In this case, it becomes possible to avoid the disposal of the packet because of the buffer overflow in the output interface circuit 16. However, a detailed timing design such as the propagation time of a back pressure signal is demanded, and thus the device design and setting become more difficult and the costs become higher.

In contrast to this, with the transmission apparatus of FIG. 2, it is possible to easily change the shaper rate of the Egress-TM circuit 14 by changing the amount of sending band correction packets. Furthermore, it is possible to easily change the shaper rate of the Egress-TM circuit 14, and thus it is possible to reduce the costs.

In the above, although the FPGA 18 generates the band correction packet based on the instruction of the CPU 17, it may also be possible for the CPU 17 to generate and output the band correction packet.

Furthermore, it may also be possible to mount the function of generating the band correction packet of the FPGA 18 in the Egress-TM circuit 14.

According to the disclosed apparatus, it is possible to eliminate the difference between the band after the packet shaping and the physical line band.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. A transmission apparatus which transmits user packets, comprising:
    a shaping circuit configured to shape traffic of packets within a limited shaping rate that is specified from among discrete values with a predetermined granularity;
    a packet generation circuit configured to generate band correction packets whose rate is smaller than the predetermined granularity, and enter the generated band correction packets to the shaping circuit, as part the traffic of packets to be shaped; and
    a queue circuit, as part of the shaping circuit, configured to store the packets to be shaped which include both the user packets to be transmitted and the band correction packets entered from the packet generation circuit.

2. The transmission apparatus according to claim 1, further comprising a switch which switches destinations of packets from one to another,
    wherein the band correction packets are entered to the shaping circuit via the switch.

3. The transmission apparatus according to claim 1, further comprising a processor which is provided on an output side of the shaping circuit and which deletes the band correction packets.

4. The transmission apparatus according to claim 3,
    wherein the band correction packets contain information that identifies the band correction packets themselves, and
    the processor deletes the band correction packet based on the information.

5. The transmission apparatus according to claim 1,
    wherein the band correction packets contain a check pattern for checking a path of packets.

6. The transmission apparatus according to claim 1,
    wherein the shaping circuit determines which packets to output, based on priorities assigned to the packets, and
    the band correction packets have a highest priority.

7. An interface card included in a transmission apparatus which transmits user packets, the interface card comprising:
    a shaping circuit configured to shape traffic of packets within a limited shaping rate that is specified from among discrete values with a predetermined granularity;
    a packet generation circuit configured to generate band correction packets whose rate is smaller than the predetermined granularity, and enter the generated band correction packets to the shaping circuit, as part the traffic of packets to be shaped; and
    a queue circuit, as part of the shaping circuit, configured to store the packets to be shaped which include both the user packets to be transmitted and the band correction packets entered from the packet generation circuit.

* * * * *